US006317312B1

(12) United States Patent
Hashizawa et al.

(10) Patent No.: US 6,317,312 B1
(45) Date of Patent: Nov. 13, 2001

(54) POWER-SUPPLY BREAKER APPARATUS

(75) Inventors: Shigemi Hashizawa; Hidehiko Kuboshima; Masayuki Karamatsu, all of Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/487,488

(22) Filed: Jan. 19, 2000

(30) Foreign Application Priority Data

Jan. 27, 1999 (JP) ........................................ 11-018952

(51) Int. Cl.[7] .............................. H02B 1/18; H02B 1/26; H01H 85/20

(52) U.S. Cl. ........................ 361/642; 361/626; 361/646; 337/194

(58) Field of Search .................................. 361/626, 104, 361/642, 646, 833, 835, 837; 337/1, 4, 5, 9, 142, 186, 208, 194; 307/112, 116, 125, 130, 131, 149; 315/88, 93, 129, 130, 136; 340/500, 522, 540, 635, 652, 657, 660, 638, 639

(56) References Cited

U.S. PATENT DOCUMENTS

| | | | | |
|---|---|---|---|---|
| 1,966,716 | * | 7/1934 | Green | 200/114 |
| 2,186,813 | * | 1/1940 | Adam et al. | 200/114 |
| 2,289,122 | * | 7/1942 | Jackson et al. | 200/114 |
| 2,636,096 | * | 4/1953 | Di Blasi | 200/115.5 |
| 3,030,474 | * | 4/1962 | Scott, Jr. | 200/133 |
| 3,202,788 | * | 8/1965 | George | 200/133 |
| 3,358,100 | * | 12/1967 | Schleicher | 200/114 |
| 3,379,842 | * | 4/1968 | Downs et al. | 200/114 |
| 3,775,727 | * | 11/1973 | Wise | 339/14 R |
| 3,840,781 | * | 10/1974 | Brown | 317/16 |
| 4,283,100 | * | 8/1981 | Griffin et al. | 339/19 |
| 4,500,862 | * | 2/1985 | Shedd | 337/32 |
| 4,767,359 | * | 8/1988 | Martell | 439/535 |
| 4,871,924 | * | 10/1989 | Sellati | 307/86 |
| 5,906,508 | * | 5/1999 | Jeffcoat | 439/509 |
| 5,973,418 | * | 10/1999 | Ciesielka et al. | 307/130 |
| 5,993,225 | * | 11/1999 | Johnson et al. | 439/136 |

FOREIGN PATENT DOCUMENTS

| | | | | |
|---|---|---|---|---|
| 0411216-A1 | * | 2/1991 | (EP) | 439/101 |
| 11-176507-A | * | 7/1999 | (JP) | H01R/13/44 |

* cited by examiner

*Primary Examiner*—Gerald Tolin
*Assistant Examiner*—Anatoly Vortman
(74) *Attorney, Agent, or Firm*—Finnegan, Henderson, Farabow, Garrett & Dunner, L.L.P.

(57) ABSTRACT

A power-supply breaker apparatus of the present invention includes a fuse provided between a power supply and a load in an electric circuit, an apparatus main body for housing the fuse, a first bus bar whose one end is fixed to one fuse terminal of the fuse, a second bus bar having one end fixed to one of the power supply and the load, a plug housing chamber for housing the plug in the apparatus main body movably in a fitting/detaching direction, and a pair of plug side terminals which become conductive with each other in the plug. The other end of the first bus bar is extended so as to be composed as one terminal of the pair of main body side terminals, and the other end of the second bus bar is extended so as to be composed as the other terminal of the pair of main body side terminals. At least one of the first bus bar and the second bus bar is freely deflected in a direction crossing substantially perpendicularly to a fitting/detaching direction so that a distance between the pair of main body side terminals varies.

4 Claims, 4 Drawing Sheets

POWER-SUPPLY BREAKER APPARATUS

BACKGROUND OF THE INVENTION

The present invention relates to a power-supply breaker apparatus, and more specifically relates to a power-supply breaker apparatus for breaking an electric circuit suitably when operational maintenance for a power-supply circuit and equipments of an electric automobile and the like is performed.

In recent years, since a transportation equipment such as an electric automobile is provided with a high-voltage portion for driving a motor, it is equipped with a power-supply breaker apparatus taking maintenance into consideration.

SUMMARY OF THE INVENTION

According to the examination by the inventors, a power-supply breaker apparatus shown in FIGS. 5 and 6 is suggested.

As shown in FIGS. 5 and 6, a pair of main body side terminals 2 and 3 are provided in an apparatus main body 1 of the power-supply breaker apparatus so as to be fastened thereto by screws 4.

Base ends of a pair of operation side terminals 5 and 6 are rotatively supported to the apparatus main body 1, and the ends of the pair of operation side terminals 5 and 6 are connected at a holding section 7.

In such a structure, the holding section 7 is rotated in a counterclockwise direction in the drawing, and the pair of operation side terminals 5 and 6 are fitted between nipping end pieces 2*a* and 2*a* and between nipping end pieces 3*a* and 3*a* of the pair of main body side terminals 2 and 3 so that the electric circuit is conductive.

Meanwhile, the holding section 7 in this state is rotated in a clockwise direction in the drawing and the pair of operation side terminals 5 and 6 are detached from the pair of main body side terminals 2 and 3 so that the electric circuit is broken.

Therefore, when the transportation equipment equipped with the power-supply breaker apparatus is maintained, the electric circuit can be broken.

However, in this power-supply breaker apparatus, since the pair of main body side terminals 2 and 3, which are receiving sides of the pair of operation side terminals 5 and 6, are fixed to the apparatus main body 1, if a pitch P1 between the pair of main body side terminals 2 and 3 differs from a pitch P2 between the pair of operation side terminals 5 and 6, a fit detaching force between both the terminals increases so that operability of the holding section 7 is deteriorated.

Therefore, the present invention has been achieved in order to solve the above examined problem. It therefore is an object of the present invention to provide a power-supply breaker apparatus in which even in the case where a pitch between one pair of terminals for making conductive/breaking an electric circuit differs from a pitch between the other pair of terminals, a fit detaching force (fitting/detaching force) between both the terminals does not increase and operability of a plug can be improved.

A power-supply breaker apparatus of the present invention includes a fuse provided between a power supply and a load in an electric circuit, an apparatus main body for housing the fuse, a first bus bar whose one end is fixed to one fuse terminal of the fuse, a second bus bar fixed to one of the power supply and the load, a plug housing chamber for housing a plug movably in the fitting/detaching direction in the apparatus main body, and a pair of plug side terminals being conductive with each other in the plug. Here, the electric circuit becomes conductive via the fuse, and the other end of the first bus bar is extended so as to be composed as one terminal of the pair of main body side terminals, and the other end of the second bus bar is extended so as to be composed as the other terminal of the pair of main body side terminals. At least one of the first bus bar and the second bus bar is freely deflected in a direction crossing substantially perpendicularly to the fitting/detaching direction so that a distance between the pair of main body side terminals varies, and the plug moves in the fitting/detaching direction so that the pair of plug side terminals are freely fitted into and detached from the pair, of main body side terminals.

In this structure, even if a pitch of the pair of main body side terminals differs from a pitch of the pair of plug side terminals, at least one of the first bus bar and the second bus bar is deflected so that at least one of the pair of main body side terminals moves in the direction crossing perpendicularly to the terminal fitting/detaching direction, and thus the terminals can shift so that the pitch between the pair of main body side terminals agrees with the pitch between the pair of plug side terminals. As a result, the difference of the pitches can be absorbed, and a fitting/detaching force can be approximately constant.

As a result, operability of the plug can be improved.

Further, since both the first bus bar and the second bus bar are extended so that their other ends are composed as the main body side terminals, a number of parts can be reduced and thus the cost can be lowered.

More concretely, it is preferable that at least one of the first bus bar and the second bus bar has a laminated structure that a plurality of thin electrically conductive plate materials are laminated.

According to this structure, since at least one of the first bus bar and the second bus bar is deflected freely in the direction crossing perpendicularly to the terminal fitting/detaching direction in order to provide the laminated structure that a plurality of thin electrically conductive plate materials are laminated, a predetermined deflection characteristic can be obtained easily and securely by changing a number of the thin electrically conductive plate materials.

In addition, it is preferable that in the apparatus main body and the plug, a pair of conduciveness detection-use terminals, which are fitted into and detached from each other according to fitting and detaching between the pair of main body side terminals and the plug side terminals, are provided respectively.

According to this structure, since the pair of conduciveness detection-use terminals on the apparatus main body side are fitted into and detached from the pair of conduciveness detection-use terminals on the plug side according to the fitting and detaching between the pair of main body side terminals and the pair of plug side terminals, the conductive and breaking states of the electric circuit can be detected easily and securely.

DETAILED DESCRIPTION OF THE PREFERRED EMBODIMENT

Figure 1:
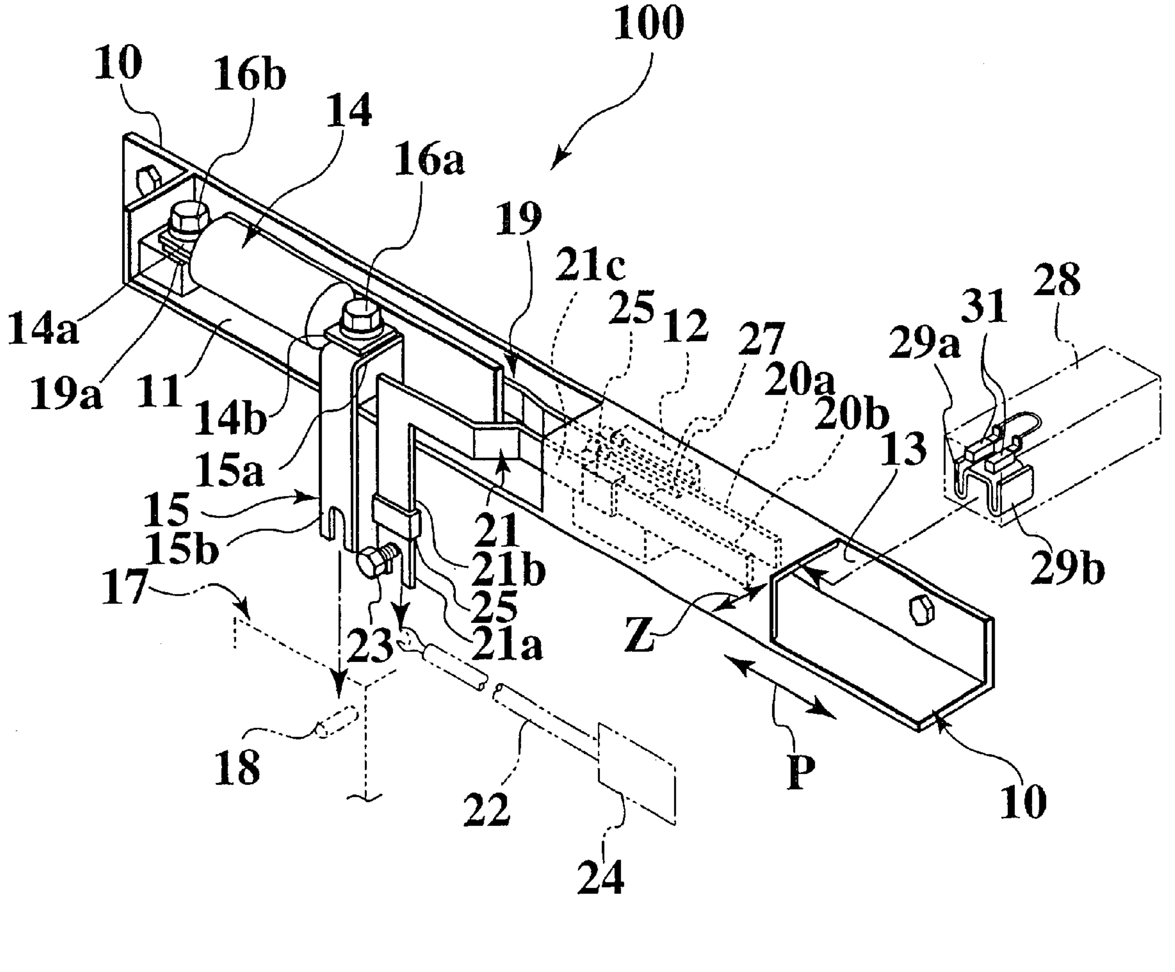
FIG. 1 is a perspective view of a power-supply breaker apparatus according to an embodiment of the present invention.
Figure 2:
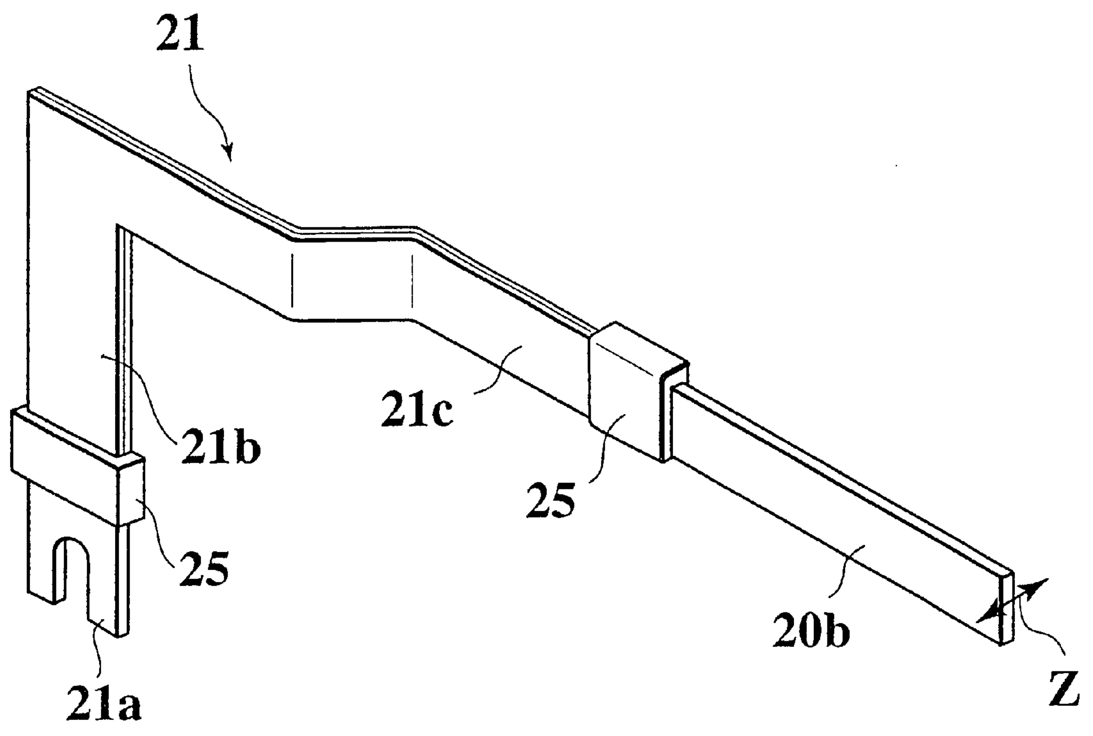
FIG. 2 is a perspective view of a second bus bar of the power-supply breaker apparatus according to the embodiment.

There will be detailed below an embodiment of the present invention with reference to the diagrams.

As shown in FIGS. 1 through 4, in a substantially box-shaped apparatus main body 10, made of synthetic resin, of a power-supply breaker apparatus 100 of the embodiment, a fuse housing chamber 11, a quadratic piped terminal housing chamber 12 and a plug housing chamber 13 are provided on a straight line.

A fuse 14 is housed in the fuse housing chamber 11.

The other fuse terminal 14*b* of the fuse 14 as well as one end 15*a* of a power-supply side bus bar 15 is fastened by a bolt 16*a* so that the fuse 14 is electrically connected with the power-supply side bus bar 15. The other end 15*b* of the power-supply side bus bar 15 is connected with a battery post (electrode) 18 of a battery (power supply) 17.

Meanwhile, one fuse terminal 14*a* of the fuse 14 as well as one end 19*a* of a first bus bar 19 is fastened by a bolt 16*b* so that the fuse 14 is electrically connected with the first bus bar 19.

The first bus bar 19 is formed by bending one copper plate material into a bus bar shape, and is extended to the terminal housing chamber 12. The other end of the first bus bar 19 is composed as one main body side terminal 20*a*.

On end 21*a* of a second bus bar 21 is formed by one copper plate material. The one end 21*a* as well as one end of an electric wire 22 is fixed to a predetermined position on the battery 17 side by a bolt 23, and the other end of the electric wire 22 is connected with a motor (load) 24.

A central portion of the second bus bar 21 has a substantially L shape, and it is constituted so that a plurality of thin copper plate materials (electrically conductive plate material) are laminated and its both end sides are contact bonded to be fixed by contact bonding-use copper plates 25.

Namely, the central portion of the second bus bar 21 is composed of a vertical portion 21*b* and a horizontal portion 21*c* positioned on an upper end of the vertical portion 21*b*, and the horizontal portion 21*c* is extended to the terminal housing chamber 12.

The horizontal portion 21*c* of the second bus bar 21 is positioned parallel with the first bus bar 19. One rectangular copper plate material composing the other main body side terminal 20*b* is contact-bonded with.the other end of the horizontal portion 21*c* of the second bus bar 21 by the contact bonding-use copper plate 25.

As a result, the second bus bar 21 is supported only at the one end 21*a* by the bolt (fixing means) 23, and the vertical portion 21*b* and the horizontal portion 21*c* have a laminated structure where thin copper plate materials are laminated. As a result, when the other main body side terminal 20*b* receives a pressing force in a direction (a direction Z in FIGS. 1 and 3) crossing perpendicularly to a terminal fitting/detaching direction (a direction P in FIG. 1), the vertical portion 21*b* and the horizontal portion 21*c* are deflected (expanded, contracted, bent) in a direction where a distance between the terminals varies.

Figure 3:
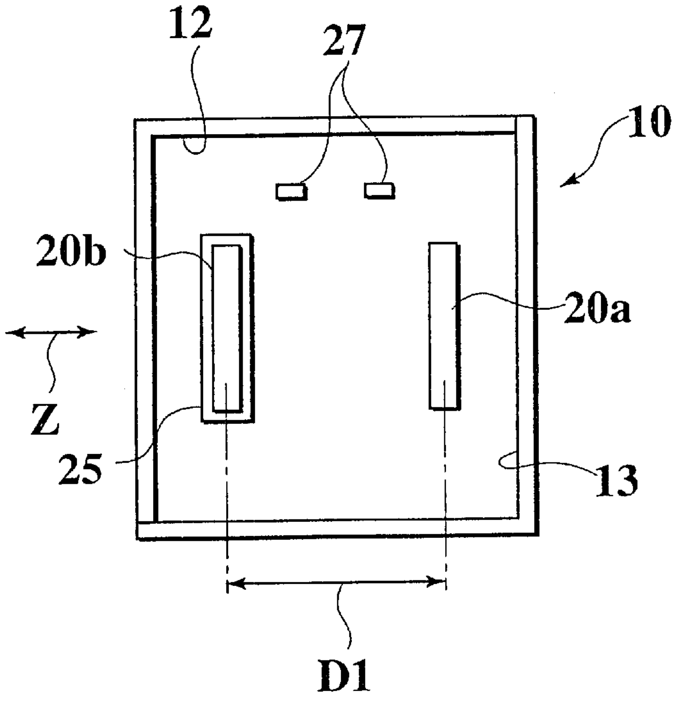
FIG. 3 is an explanatory diagram that the power-supply breaker apparatus according to the embodiment is viewed from a terminal housing chamber side.
Figure 4:
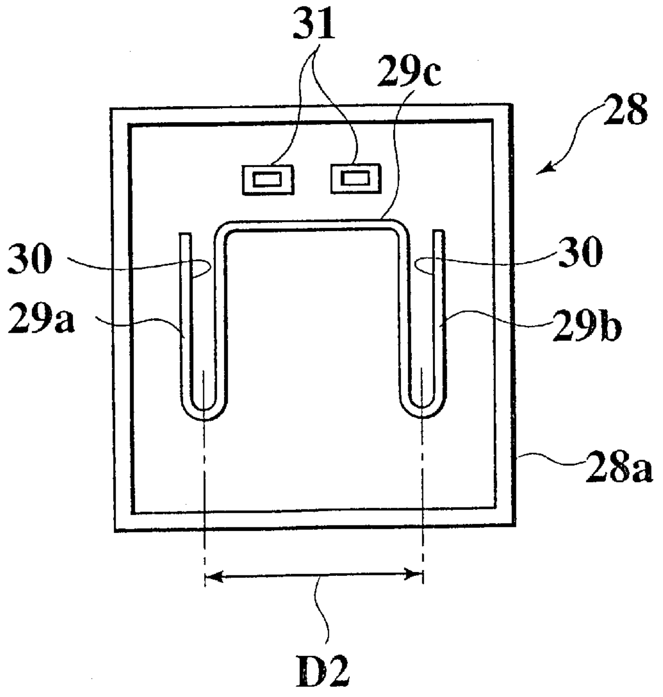
FIG. 4 is an explanatory diagram that a plug of the power-supply breaker apparatus according to the embodiment is viewed from a terminal side.
Figure 5:
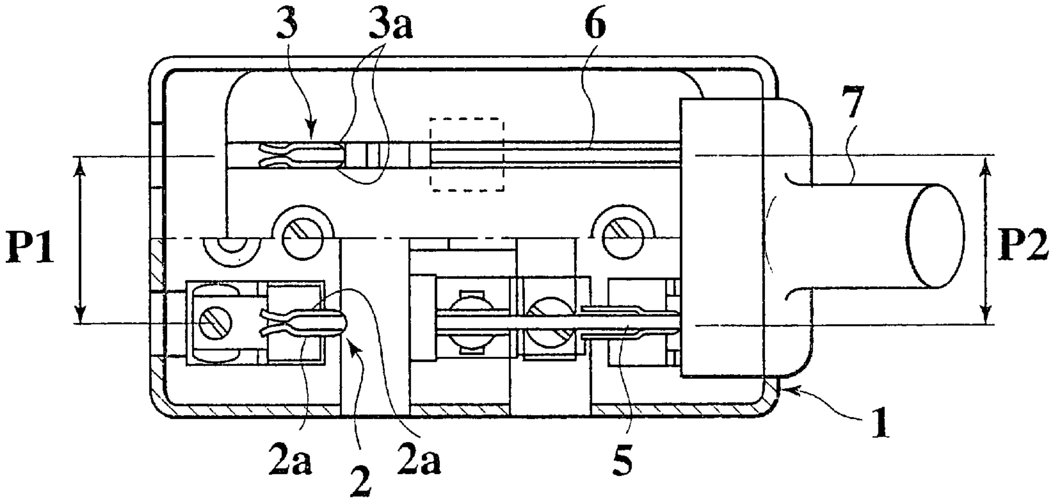
FIG.5 PRIOR ART
FIG. 5 is a plan view showing one portion, broken away, of the power-supply breaker apparatus according to an examination of the inventors.
Figure 6:
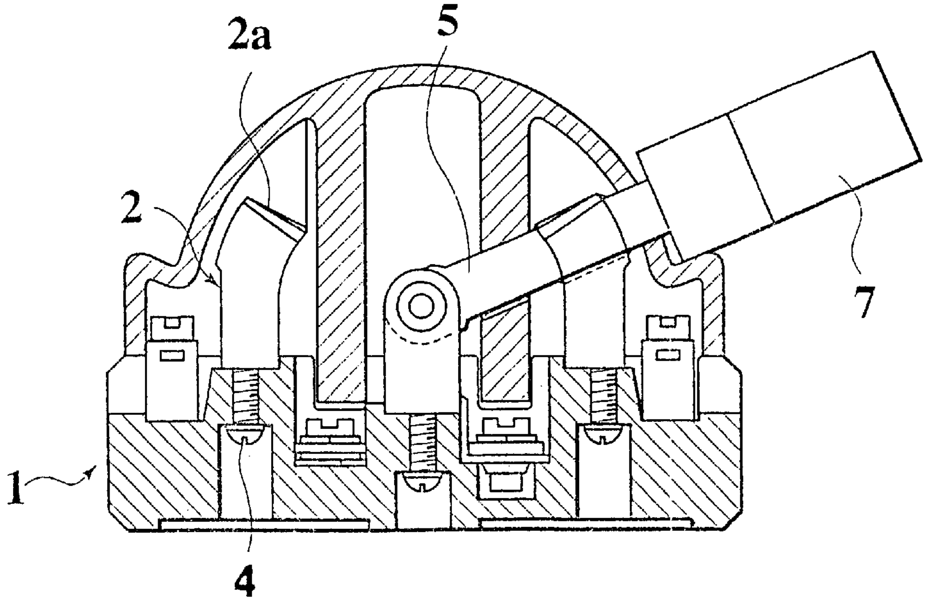
FIG.6 PRIOR ART
FIG. 6 is a sectional view of the power-supply breaker apparatus.

In addition, as mainly shown in FIGS. 1 and 3, a pair of bar-shaped conduciveness detection-use terminals 27, 27 are positioned in the terminal housing chamber 12. Respective electric wires which are connected with the pair of conduciveness detection-use terminals 27, 27 are led to a conduciveness detection circuit (not shown).

A plug 28 whose main body is made of synthetic resin is positioned in the plug housing chamber 13 so as to be slid and movable in a terminal fitting/detaching direction P.

A pair of plug side terminals 29*a* and 29*b* are fixed to the plug 28, and electrical conduciveness is obtained between the pair of plug side terminals 29*a* and 29*b*.

The pair of plug side terminals 29*a* and 29*b* and an electrically conductive portion 29*c* are formed in such a manner that a copper plate material having a spring property is bent so as to form a pair of U-shaped portions and a connection portion for connecting the U-shaped portions. Namely, the pair of U-shaped portions are composed as a pair of plug side terminals 29*a* and 29*b*, and portions surrounded respectively by the U-shaped portions are terminal insertion grooves 30,30. The pair of plug side terminals 29*a* and 29*b* are positioned so as to be extended from a central portion in a hood section 28*a* of the plug 28 on a front side.

A pair of quadratic piped conduciveness detection-use terminals 31, 31 are provided to an upper central portion in the hood section 28*a* of the plug 28, and electrical conduciveness is obtained between the pair of conduciveness detection-use terminals 31, 31. As for the pair of conduciveness detection-use terminals 31, 31 on the plug 28 side and the pair of conduciveness detection-use terminals 27, 27 on the apparatus main body 10 side, their positional relationship is set so that the terminals 31, 31 are fitted into and detached from the terminals 27, 27 according to fitting and detachment between the pair of plug side terminals 29*a* and 29*b* the pair of main body side terminals 20*a* and 20*b*.

There will be described below an operation of the power-supply breaker apparatus having the above structure.

When the plug 28 in the plug housing chamber 13 is slid in the terminal fitting direction, the main body side terminals 20*a* and 20*b* are fitted into the terminal insertion grooves 30, 30 of the plug side terminals 29*a* and 29*b*. At the same time, the conduciveness detection-use terminals 31, 31 on the plug side are also fitted into the conduciveness detection-use terminals 27, 27 on the apparatus main body 10 side.

When the plug 28 is inserted to the terminal fit completing position, a conductive state is obtained between the pair of main body side terminals 20*a* and 20*b* via the pair of plug side terminals 29*a* and 29*b* so that the power of the battery 17 can be supplied to the motor 24.

Meanwhile, in the case where maintenance or the like is executed, when the plug 28 in the plug housing chamber 13 is slid in the terminal detaching direction (terminal pulling-out direction), the main body side terminals 20*a* and 20*b* are pulled out of the terminal insertion grooves 30, 30 of the plug side terminals 29*a* and 29*b*. At the same time, the conduciveness detection-use terminals 31, 31 on the plug 28 side are also pulled out of the conduciveness detection-use terminals 27, 27 on the main body 10 side.

As a result, the breaking state is obtained between the main body side terminals 20*a* and 20*b*, and thus the power of the battery 17 is not supplied to the motor 24 so that maintainability is improved.

In the above operation, when the main body side terminals 20*a* and 20*b* are fitted into the plug side terminals 29*a* and 29*b*, if a pitch D2 of the plug side terminals 29*a* and 29*b* differs from a pitch D1 between the main body side terminals 20*a* and 20*b*, the plug side terminals 29*a* and 29*b* press the main body side terminals 20*a* and 20*b* in a direction Z crossing perpendicularly to the terminal fitting/detaching direction P.

In this case, since the vertical portion 21*b* and the horizontal portion 21*c* of the second bus bar 21 having the laminated structure on the main body terminal 20*b* side are movable easily in the pressing direction, the main body terminal 20*b* shifts in the pressing direction, so that the difference of the pitches is absorbed.

Therefore, even in the case where the pitches differ from each other as mentioned above, an increase in the sliding force of the plug 28 is suppressed efficiently, and thus the operability of the plug 28 can be improved.

In addition, also in the case where the plug side terminals 29*a* and 29*b* are pulled out of the main body side terminals 20*a* and 20*b*, even if the pitches differ from each other, an increase in the sliding force of the plug 28 is suppressed efficiently, and thus the operability of the plug 28 can be improved.

In addition, in the above structure, since the first bus bar 19 and the second bus bar 21 are extended so that their other ends are composed as the main body side terminals 20*a* and 20*b*, a number of parts is reduced, and thus installation becomes easy and the cost is lowered.

Furthermore, in the above-mentioned operation, according to the fitting and detachment between the main body side terminals 20*a* and 20*b* and the plug side terminals 29*a* and 29*b*, the conduciveness detection-use terminals 27, 27 on the apparatus main body 10 side are fitted into or detached from the conduciveness detection-use terminals 31, 31 on the plug 28 side, and thus the conductive and breaking states of the electric circuit can be detected easily and securely.

According to the present embodiment, the central portion of the second bus bar 21 is deflected in the direction crossing perpendicularly to the terminal fitting/detaching direction so as to be deformed freely, but the first bus bar 19 may be deflected in the direction crossing perpendicularly to the terminal fitting/detaching direction so as to be freely deformed as well.

In addition, both the first and second bus bars 19 and 21 may be deflected in the direction crossing perpendicularly to the terminal fitting/detaching direction so as to be freely deformed. In the case where both the first and second bus bars 19 and 21 are deflected so as to be freely deformed, there is an advantage because an amount of absorbing the different of the pitches becomes great.

In addition, the bus bar has the laminated structure that a plurality of thin copper plate materials are laminated so as to be deflected and deformed freely, but it may be a single-layered member as long as the material is a single-layered copper member and predetermined deflection characteristic is obtained. However, in the case the bus bar has the laminated structure that a plurality of thin copper plate materials are laminated, a number of the copper plate materials are varied so that the predetermined deflection characteristic is easily obtained.

This invention may be embodied in several forms without departing from the spirit of essential characteristics thereof,

What is claimed is:

1. A power-supply breaker apparatus, comprising:

a fuse provided between a power supply and a load in an electric circuit, the electric circuit becoming conductive through the fuse;

an apparatus main body housing the fuse;

a first bus bar whose one end is fixed to one fuse terminal of the fuse, the other end of the first bus bar being extended so as to be composed as one of a pair of main body side terminals;

a second bus bar fixed to one of the power supply and the load, the other end of the second bus bar being extended so as to be composed as the other one of the pair of main body side terminals;

a plug housing chamber housing a plug movably in a fitting/detaching direction in the apparatus main body; and a pair of plug side terminals being conductive with each other in the plug, wherein at least one of the first bus bar and the second bus bar is deflected freely in a direction crossing substantially perpendicularly to the fitting/detaching direction so that a distance between the pair of main body side terminals varies, and the plug moves in the flitting/detaching direction so that the pair of plug side terminals are freely fitted into and detached from the pair of main body side terminals.

2. A power-supply breaker apparatus according to claim 1, wherein when the pair of plug side terminals are fitted into and detached from the pair of main body side terminals, at least one of the first bus bar and the second bus bar is deflected freely in the direction crossing substantially perpendicularly to the fitting/detaching direction so that the distance between the main body side terminals varies.

3. A power-supply breaker apparatus according to claim 1, wherein at least one of the first bus bar and the second bus bar has a laminated structure where a plurality of thin electrically conductive plate materials are laminated.

4. A power-supply breaker apparatus according to claim 1, wherein in the apparatus main body and the plug, a pair of conduciveness detection-use terminals, which are fitted into and detached from each other according to fitting and detaching between the pair of main body side terminals and the plug side terminals, are provided respectively.

* * * * *